United States Patent
Kalla et al.

(10) Patent No.: US 7,401,207 B2
(45) Date of Patent: Jul. 15, 2008

(54) APPARATUS AND METHOD FOR ADJUSTING INSTRUCTION THREAD PRIORITY IN A MULTI-THREAD PROCESSOR

(75) Inventors: Ronald Nick Kalla, Round Rock, TX (US); Minh Michelle Quy Pham, Austin, TX (US); Balaram Sinharoy, Poughkeepsie, NY (US); John Wesley Ward, III, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 10/424,529

(22) Filed: Apr. 25, 2003

(65) Prior Publication Data

US 2004/0216106 A1     Oct. 28, 2004

(51) Int. Cl.
G06F 9/40 (2006.01)
G06F 9/44 (2006.01)
(52) U.S. Cl. .................. 712/215; 712/206; 718/103
(58) Field of Classification Search ......... 718/100–108, 718/1; 712/1–300
See application file for complete search history.

(56) References Cited

U.S. PATENT DOCUMENTS

| | | | |
|---|---|---|---|
| 4,642,756 A * | 2/1987 | Sherrod ................. | 718/103 |
| 6,073,159 A | 6/2000 | Emer et al. | |
| 6,076,157 A | 6/2000 | Borkenhagen et al. | |
| 6,212,544 B1 | 4/2001 | Borkenhagen et al. | |
| 6,341,347 B1 | 1/2002 | Joy et al. | |
| 6,658,447 B2 * | 12/2003 | Cota-Robles ............ | 718/103 |
| 6,981,261 B2 | 12/2005 | Kalafatis et al. | |
| 2001/0056456 A1 | 12/2001 | Cota-Robles | |
| 2002/0103990 A1 | 8/2002 | Potash | |

FOREIGN PATENT DOCUMENTS

EP          0 790 557 A2     8/1997

(Continued)

OTHER PUBLICATIONS

Fisk, Stuart et al. "Thread Prioritization: A Thread Scheduling Mechanism for Multiple-Context Parallel Processors." First International Symposium of High Performance Computer Architecture (Raleigh, NC, Jan. 1995), pp. 210-221.*

Utiyama et al., "Design and Implementation of Multithreaded Processor for Real-Time Operation," Technical Report of IEICE (Mar. 22, 2000), pp. 29-36, vol. 99(725).

Snavely et al., "Symbiotic Jobscheduling with Priorities for a Simultaneous Multithreading Processor," SIGMETRICS Conf. Measurement and Modeling of C.S. (Jun. 2002), pp. 66-76.

*Primary Examiner*—Lewis A. Bullock, Jr
(74) *Attorney, Agent, or Firm*—Casimer K. Salys; Russell D. Culbertson; The Culbertson Group, P.C.

(57) ABSTRACT

Each instruction thread in a SMT processor is associated with a software assigned base input processing priority. Unless some predefined event or circumstance occurs with an instruction being processed or to be processed, the base input processing priorities of the respective threads are used to determine the interleave frequency between the threads according to some instruction interleave rule. However, upon the occurrence of some predefined event or circumstance in the processor related to a particular instruction thread, the base input processing priority of one or more instruction threads is adjusted to produce one more adjusted priority values. The instruction interleave rule is then enforced according to the adjusted priority value or values together with any base input processing priority values that have not been subject to adjustment.

6 Claims, 3 Drawing Sheets

FOREIGN PATENT DOCUMENTS

| | | |
|---|---|---|
| JP | 09-282184 | 10/1997 |
| JP | 10-124316 | 5/1998 |
| JP | 2000-020323 | 1/2000 |
| JP | 2001-306323 | 11/2001 |
| WO | WO 00/67113 | 11/2000 |
| WO | WO 02/067116 A2 | 8/2002 |

* cited by examiner

APPARATUS AND METHOD FOR ADJUSTING INSTRUCTION THREAD PRIORITY IN A MULTI-THREAD PROCESSOR

RELATED APPLICATIONS

This application is related to U.S. patent application Ser. No. 10/424,533, entitled "METHOD AND APPARATUS FOR RANDOMIZING THREAD INTERLEAVING IN A MULTI-THREAD PROCESSORS" and U.S. patent application Ser. No. 10/424,530, entitled "METHOD AND APPARATUS FOR SELECTING AN INSTRUCTION THREAD FOR PROCESSING IN A MULTI-THREAD PROCESSOR," each filed simultaneously herewith. The entire content of each of these related applications is hereby incorporated by reference into the present application.

TECHNICAL FIELD OF THE INVENTION

This invention relates to data processors that process multiple, interleaved instruction threads on a cycle-by-cycle basis according to a priority rule. More particularly, the invention relates to adjusting the priority assigned to a particular instruction thread based on events or conditions associated with the instruction threads.

BACKGROUND OF THE INVENTION

A number of techniques are used to improve the speed at which data processors execute software programs. These techniques include increasing the processor clock speed, using cache memory, and using predictive branching. Increasing the processor clock speed allows a processor to perform relatively more operations in any given period of time. Cache memory is positioned in close proximity to the processor and operates at higher speeds than main memory, thus reducing the time needed for a processor to access data and instructions. Predictive branching allows a processor to execute certain instructions based on a prediction about the results of an earlier instruction, thus obviating the need to wait for the actual results and thereby improving processing speed.

Some processors also employ pipelined instruction execution to enhance system performance. In pipelined instruction execution, processing tasks are broken down into a number of pipeline steps or stages. Pipelining may increase processing speed by allowing subsequent instructions to begin processing before previously issued instructions have finished a particular process. The processor does not need to wait for one instruction to be fully processed before beginning to process the next instruction in the sequence.

Processors that employ pipelined processing may include a number of different pipeline stages which are devoted to different activities in the processor. For example, a processor may process sequential instructions in a fetch stage, decode/dispatch stage, issue stage, execution stage, finish stage, and completion stage. Each of these individual stages may employ its own set of pipeline stages to accomplish the desired processing tasks.

Multi-thread instruction processing is an additional technique that may be used in conjunction with pipelining to increase processing speed. Multi-thread instruction processing involves dividing a set of program instructions into two or more distinct groups or threads of instructions. This multithreading technique allows instructions from one thread to be processed through a pipeline while another thread may be unable to be processed for some reason. This avoids the situation encountered in single threaded instruction processing in which all instructions are held up while a particular instruction cannot be executed, such as, for example, in a cache miss situation where data required to execute a particular instruction is not immediately available. Data processors capable of processing multiple instruction threads are often referred to as simultaneous multithreading (SMT) processors.

It should be noted at this point that there is a distinction between the way the software community uses the term "multithreading" and the way the term "multithreading" is used in the computer architecture community. The software community uses the term "multithreading" to refer to a single task subdivided into multiple, related threads. In computer architecture, the term "multithreading" refers to threads that may be independent of each other. The term "multithreading" is used in this document in the same sense employed by the computer architecture community.

To facilitate multithreading, the instructions from the different threads are interleaved in some fashion at some point in the overall processor pipeline. There are generally two different techniques for interleaving instructions for processing in a SMT processor. One technique involves interleaving the threads based on some long latency event, such as a cache miss that produces a delay in processing one thread. In this technique all of the processor resources are devoted to a single thread until processing of that thread is delayed by some long latency event. Upon the occurrence of the long latency event, the processor quickly switches to another thread and advances that thread until some long latency event occurs for that thread or until the circumstance that stalled the other thread is resolved.

The other general technique for interleaving instructions from multiple instruction threads in a SMT processor involves interleaving instructions on a cycle-by-cycle basis according to some interleaving rule (also sometimes referred to herein as an interleave rule). A simple cycle-by-cycle interleaving technique may simply interleave instructions from the different threads on a one-to-one basis. For example, a two-thread SMT processor may take an instruction from a first thread in a first clock cycle, an instruction from a second thread in a second clock cycle, another instruction from the first thread in a third clock cycle and so forth, back and forth between the two instruction threads. A more complex cycle-by-cycle interleaving technique may involve using software instructions to assign a priority to each instruction thread and then interleaving instructions from the different threads to enforce some rule based upon the relative thread priorities. For example, if one thread in a two-thread SMT processor is assigned a higher priority than the other thread, a simple interleaving rule may require that twice as many instructions from the higher priority thread be included in the interleaved stream as compared to instructions from the lower priority thread.

A more complex cycle-by-cycle interleaving rule in current use assigns each thread a priority from "1" to "7" and places an instruction from the lower priority thread into the interleaved stream of instructions based on the function $1/(2^{|X-Y|+1})$, where X=the software assigned priority of a first thread, and Y=the software assigned priority of a second thread. In the case where two threads have equal priority, for example, X=3 and Y=3, the function produces a ratio of ½, and an instruction from each of the two threads will be included in the interleaved instruction stream once out of every two clock cycles. If the thread priorities differ by 2, for example, X=2 and Y=4, then the function produces a ratio of ⅛, and an instruction from the lower priority thread will be included in the interleaved instruction stream once out of every eight clock cycles.

Using a priority rule to choose how often to include instructions from particular threads is generally intended to ensure that processor resources are allotted based on the software assigned priority of each thread. There are, however, situations in which relying on purely software assigned thread priorities may not result in an optimum allotment of processor resources. In particular, software assigned thread priorities cannot take into account processor events, such as a cache miss, for example, that may affect the ability of a particular thread of instructions to advance through a processor pipeline. Thus, the occurrence of some event in the processor may completely or at least partially defeat the goal of assigning processor resources efficiently between different instruction threads in a multi-thread processor.

For example, a priority of 5 may be assigned by software to a first instruction thread in a two thread system, while a priority of 2 may be assigned by software to a second instruction thread. Using the priority rule $1/(2^{|X-Y|+1})$ described above, these software assigned priorities would dictate that an instruction from the lower priority thread would be interleaved into the interleaved instruction stream only once every sixteen clock cycles, while instructions from the higher priority instruction thread would be interleaved fifteen out of every sixteen clock cycles. If an instruction from the higher priority instruction thread experiences a cache miss, the priority rule would still dictate that fifteen out of every sixteen instructions comprise instructions from the higher priority instruction thread, even though the occurrence of the cache miss could effectively stall the execution of the respective instruction thread until the data for the instruction becomes available.

SUMMARY OF THE INVENTION

The present invention includes apparatus and methods for adjusting the processing priority of at least one instruction thread to be interleaved in a SMT processor. Each instruction thread is associated with a software assigned base input processing priority. Unless some predefined event or circumstance occurs with an instruction being processed or to be processed, the base input processing priorities of the respective threads are used to determine the interleave frequency between the threads according to some instruction interleave rule. This interleave frequency comprises the frequency with which instructions from respective threads are selected for inclusion in an interleaved stream of instructions to be processed in the data processor. However, upon the occurrence of some predefined event or circumstance in the processor related to a particular instruction thread, the present invention adjusts the base input processing priority of one or more instruction threads to produce one or more adjusted priority values. The interleave rule is then enforced according to the adjusted priority value or values together with any base input processing priority values that have not been subject to adjustment. This process of adjusting the base input priorities of one or more instruction threads allows the processor to react to events or circumstances in the processor that would otherwise reduce the overall speed at which the processor executes instructions. Thus, the present invention may be used to help improve processing performance in SMT processors.

A method according to the present invention includes receiving a base input processing priority signal and a feedback signal. The base input processing priority signal is associated with one of multiple instruction threads to be interleaved in a data processor, and indicates the base input processing priority of the associated instruction thread. The feedback signal is also associated with one of the instruction threads, and indicates the processing status of the associated instruction thread. For example, a suitable feedback signal may comprise a signal indicating that an instruction has experienced a cache miss, an empty buffer, or some other event that affects the ability of instruction to be processed. An adjusted priority signal representing the adjusted priority value for one of the instruction threads is generated in response to the feedback signal.

An adjusted priority signal generated according to the invention is, like the base input processing priority signal and the feedback signal, associated with one of the instruction threads to be interleaved. However, the instruction thread with which an adjusted priority signal is associated may or may not be the same instruction thread with which the feedback signal is associated. That is, an event or circumstance affecting the processing of an instruction from a first instruction thread may result in a feedback signal that prompts an adjustment to the base input processing priority signal of the first instruction thread or some other instruction thread.

The invention includes a circuit for use in a processor that interleaves instructions from a number of instruction threads on a cycle-by-cycle basis. In one preferred form, the circuit includes an adjustment multiplexer (MUX) having a control input, a base priority input, an adjusted priority input, and a MUX output. The base priority input receives one of the base input processing priority signals indicating the base input processing priority value of a particular instruction thread. The adjusted priority input receives an adjusted priority signal indicating an adjusted input processing priority value for the same instruction thread. The control input of the MUX receives a control signal that selects whether the base priority input or the adjusted priority input is coupled to the MUX output. The output of the MUX provides a final adjusted priority signal that includes either the base input processing priority signal or the adjusted base input processing priority signal. Thus, the control signal controls whether the input processing priority of the instruction thread will remain unchanged (the base priority input is selected to be coupled to the MUX output) or will be adjusted (the adjusted priority input is selected to be coupled to the MUX output).

In addition to the adjustment MUX, the invention includes a MUX controller. The MUX controller generates the control signal for the adjustment MUX in response to feedback from one or more instruction processing elements in the SMT processor. The feedback may be a signal from an instruction cache, a data cache, an execution unit, etc., indicating that an instruction from a particular instruction thread is experiencing some event or circumstance that delays processing of the instruction or some other instruction. These types of events are sometimes referred to herein as long-latency events. Based on this feedback, the MUX controller selects a particular one of the MUX inputs (either the base priority input or the adjusted priority input) to be coupled to the MUX output.

Adjustment logic coupled to the adjusted priority input of the adjustment MUX may generate the adjusted priority signal based, in part, on the base priority signal. The adjusted priority signal may represent either a lower or higher priority value than the priority value represented by the base input process priority signal. In one form, the adjustment logic receives feedback in the same manner as the MUX controller, and sets the adjusted priority signal in response to this feedback. In a preferred form of the invention, however, the adjustment logic applies a fixed offset to the priority indicated by the base input processing priority signal regardless of any feedback.

These and other advantages and features of the invention will be apparent from the following description of the preferred embodiments, considered along with the accompanying drawings.

DESCRIPTION OF PREFERRED EMBODIMENTS

Figure 1:
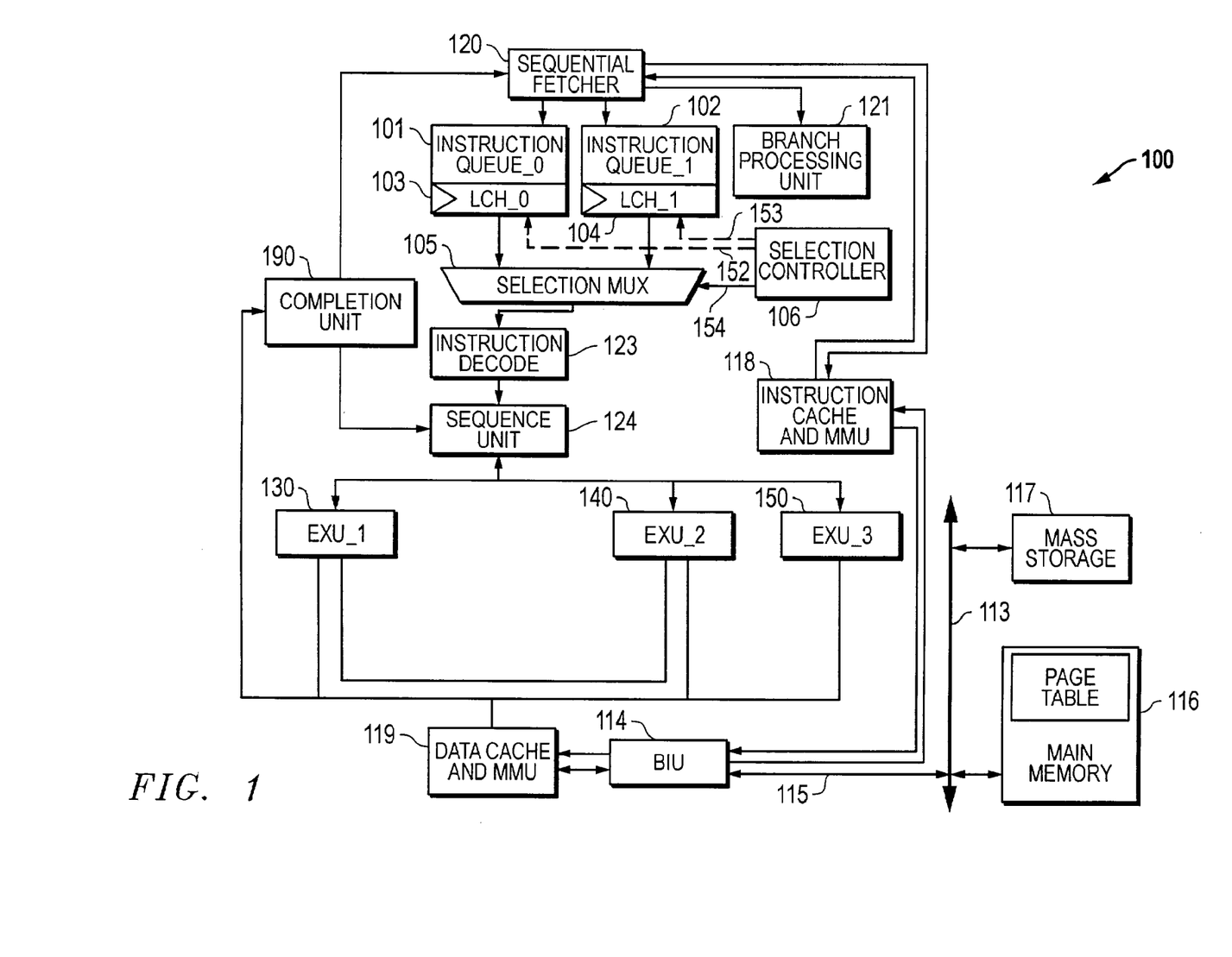
FIG. 1 is a block diagram of a processor including a priority adjustment arrangement according to the present invention.

FIG. 1 illustrates a processor 100 embodying the principles of the invention. Processor 100 accommodates multithreading and includes a first instruction queue 101 (Queue_0), a second instruction queue 102 (Queue_1), selection multiplexer (MUX) 105, and selection controller 106. Each instruction queue 101 and 102 is dedicated to handling instructions in a respective thread of instructions. More particularly, first instruction queue 101 queues instructions from a first instruction thread T0 while second instruction queue 102 queues instructions from a second instruction thread T1. A sequential fetcher 120 transfers instructions making up the two different instruction threads from instruction cache and memory management unit (MMU)118 to instruction queues 101 and 102. Instruction queues 101 and 102 ultimately feed their respective instructions to the two inputs of selection MUX 105. Selection controller 106 controls selection MUX 105 to interleave instructions from the two different instruction threads into a single interleaved stream of instructions for further processing.

As will be described further below with reference to FIGS. 2 and 3, each instruction thread is assigned a base priority and selection controller 106 uses these base priorities or base priorities together with one or more adjusted priorities to enforce a rule regarding the frequency with which instructions from each queue (101 or 102) are placed in the interleaved stream for processing. The adjusted priority reflects a priority either higher or lower than the assigned base priority, and is determined by controller 106 in response to feedback received from processing elements included in processor 100. The output of selection controller 106 comprises a control signal applied to thread selection control path 154. This control signal on thread selection control path 154 specifies which input of MUX 105 is to be passed on for further processing during a particular clock cycle. Since each input of MUX 105 is coupled to an instruction queue containing instructions from different threads, selecting a particular input of MUX 105 has the effect of selecting a particular instruction thread for processing.

In the illustrative embodiment shown in FIG. 1, processor 100 comprises a single integrated circuit superscalar microprocessor. Accordingly, processor 100 includes various execution units, registers, buffers, memory devices, and other functional units, which are all formed by integrated circuitry. Of course, although the invention is described herein as applied to a microprocessor, the present selection controller arrangement is not limited to microprocessors and may be implemented in other types of processors. Also, the general processor arrangement shown in FIG. 1 is shown only for purposes of example in explaining the operation of selection controller 106 in relation to first instruction queue 101, second instruction queue 102, and selection MUX 105. Those skilled in the art will appreciate that the selection controller described and claimed in this document may be utilized in substantially any processor arrangement capable of supporting simultaneous multiple instruction thread processing.

The processor 100 shown in FIG. 1 is coupled to system bus 113 via bus interface unit (BIU) 114 and processor bus 115. Both system bus 113 and processor bus 115 include address, data, and control buses which are not shown separately. BIU 114 participates in bus arbitration to control the transfer of information between processor 100 and other devices coupled to system bus 113, such as main memory 116 and non-volatile mass storage 117. The data processing system illustrated in FIG. 1 preferably includes other devices coupled to system bus 113; however, these other devices are not necessary for an understanding of the invention and are accordingly omitted from the drawings so as not to obscure the invention in unnecessary detail.

BIU 114 is connected to instruction cache and MMU (memory management unit) 118 and data cache and MMU 119. High-speed caches, such as those within instruction cache and MMU 118 and data cache and MMU 119, enable processor 100 to achieve relatively fast access to a subset of data or instructions previously transferred from main memory 116 to the caches, thus improving the overall processing speed. Data and instructions stored within the data cache 119 and instruction cache 118, respectively, are each identified and accessed by an effective address, which is related to the real address of the respective data or instruction in main memory 116.

Instruction cache and MMU 118 is further coupled to sequential fetcher 120, which fetches instructions for execution from instruction cache and MMU 118 during each processor cycle. Sequential fetcher 120 transmits branch instructions fetched from instruction cache and MMU 118 to branch processing unit (BPU) 121 for execution, and temporarily stores sequential instructions in first instruction queue 101 and second instruction queue 102 for eventual transfer to instruction decode unit 123 for decoding, and sequencing unit 124 for dispatch to execution units 130, 140, or 150.

Sequential fetcher 120 feeds instructions to both first instruction queue 101 and second instruction queue 102. Both instruction queues 101 and 102 are configured to shift instructions down from one queue location to the next each time an instruction is issued through selection MUX 105 to decode unit 123 for further processing. The last storage element in first instruction queue 101 comprises a first latch 103 (LCH_0) and the last storage element in second instruction queue 102 comprises a second latch 104 (LCH_1). Latches 103 and 104 maintain the latched instructions available at the respective inputs of selection MUX 105 so that when one of the MUX inputs is selected, the instructions or instructions present at the selected input are transferred to instruction decode unit 123. Note the various elements illustrated, including latches 103 and 104, may be configured to handle only a single instruction at a time or multiple instructions. In a preferred form of the invention, various illustrated elements of processor 100 are capable of handling multiple instructions simultaneously. For example, each queue location in the instruction queues 101 and 102, and the latches 103 and 104 may include sufficient storage elements to accommodate five instructions. Thus, in this example, each instruction thread (T0 and T1) as well as the stream of interleaved instructions at the output of selection MUX 105 are actually five instructions wide. The invention encompasses any instruction width through threads T0 and T1.

The execution circuitry of processor 100 comprises the three separate execution units 130, 140, and 150 for executing sequential instructions. Each individual execution unit 130, 140, and 150, preferably executes instructions in a sequence of pipeline stages unique to the particular execution unit. Both the first execution unit 130 (EXU¯1) and second execution unit 140 (EXU_2) in this example processor may be adapted to perform fixed-point mathematical and logical operations as well as load operations which load data from memory. The third execution unit 150 (EXU_3) in processor 100 may be adapted to perform complex fixed point operations. Third execution unit 150 may also perform store operations which store data to memory. Those skilled in the art will appreciate that various general purpose and floating point registers are associated with the execution units 130, 140, and 150 for temporarily storing operands and operation results. These registers are not shown in FIG. 1, since an understanding of their operation is not necessary for an understanding of the present selection controller arrangement. Numerous other elements may also be associated with execution units 130, 140, and 150, such as various queues, registers, or tables used to support out of order execution of instructions. These additional processor elements are also omitted from FIG. 1 so as not to obscure the invention in unnecessary detail.

Processor 100 processes each sequential instruction in distinct pipeline stages, namely, fetch, decode/dispatch, issue/sequence, execute, finish, and completion. Instructions from the two threads T0 and T1 stored in the two instruction queues 101 and 102, respectively, are interleaved into a single stream of instructions just prior to the decode/dispatch stage according to a priority rule enforced by selection controller 106. Because the instructions from the two threads are interleaved on a cycle-by-cycle basis prior to the decode/dispatch stage performed by decode unit 123, the stages beginning with decode/dispatch may receive an instruction from either thread on any given clock cycle. For example, in any given clock cycle processor 100 may be completing an instruction from a first thread at completion unit 190, executing instructions from either the first or second thread at execution units 130, 140, and 150, and decoding an instruction from the second thread. Simultaneously processing instructions from distinct threads allows processor 100 to continue processing instructions even if one of the instruction threads stalls due to a long latency event associated with an instruction in that particular thread. For example, assume that an instruction from thread T0 (queued through first instruction queue 101) suffers some long latency event that prevents it from being immediately processed. Because instructions from the second instruction thread T1 (queued through second instruction thread 102) are interleaved with the instructions from thread T0, those instructions may continue to be processed and pass through second instruction queue T1.

During the fetch stage, sequential fetcher 120 retrieves one or more instructions associated with one or more memory addresses from instruction cache and MMU 118. Sequential fetcher 120 stores sequential instructions fetched from instruction cache and MMU 118 in either first instruction queue 101 to be part of the first thread of instructions T0, or second instruction queue 102 to be part of the second thread of instructions T1. Branch instructions for both threads are removed or folded out by sequential fetcher 120 to BPU 121 for execution. BPU 121 includes a branch prediction mechanism (not shown separately) which, in one embodiment, comprises a dynamic prediction mechanism such as a branch history table (not shown). This branch history table enables BPU 121 to speculatively execute unresolved conditional branch instructions by predicting whether or not the branch will be taken.

Instructions from the two threads of instructions passing through first and second instruction queues 101 and 102 are interleaved into a single stream of instructions that is delivered to instruction decode unit 123 for further processing. Instruction decode unit 123 decodes the instructions and passes the instructions to sequencing unit 124 for sequencing and dispatch to execution units 130, 140, and 150. Execution units 130, 140, and 150 execute instructions issued from sequencing unit 124. Once the issued instructions are fully executed, execution units 130, 140, and 150 store the results, if any, within the associated general purpose or other registers (not illustrated) and also notify completion unit 190 that the instructions have finished execution.

It will be appreciated that the particular processor structure shown in FIG. 1 is shown only for purposes of example and that the thread priority adjustment according to the present invention is not limited to use with this particular structure. For example, although processor 100 shows branch instructions folded out of the instruction stream by sequential fetcher 120, other processor structures may treat the branch instruction unit as another execution unit along with the other execution units 130, 140, and 150. In any event, thread priority adjustment according to the present invention may be incorporated into substantially any simultaneous multithreading processor.

It should also be noted that although the illustrated processor 100 is adapted to interleave two instruction threads T0 and T1 into a single interleaved stream for processing through the various processor pipeline stages after the fetch stage, other embodiments may be adapted to interleave more than two instruction threads into a single interleaved stream of instructions for processing. It will be noted that regardless of the number of instruction threads being simultaneously processed, an instruction (or set of instructions where the pipeline is multiple instructions wide) from only a single thread may generally be passed into the interleaved stream of instructions in any given clock cycle. Thus, where more than two threads are interleaved through a selecting device such as MUX 105, the apparatus must include logic for producing MUX control signals suitable for selecting a particular one of the threads for transfer through the MUX. In the two-thread form of the invention shown in FIG. 1, the MUX control signal may be applied through the signal path 154. However, control signals for a selection MUX having more than two inputs will require additional signal paths to accommodate the required MUX control signals.

It should also be noted that certain embodiments of the present invention may have the ability to hold instructions from one or both instruction threads T0 and T1 so that valid instructions from the respective held thread do not pass on for further processing. The hold capability may be implemented through hold signals applied to the two latches 103 and 104. FIG. 1 shows dashed lines 152 and 153 from selection controller 106 to each latch 103 and 104. Where the hold capability is implemented, selection controller 106 may be used to generate the required hold signals for each thread and apply those signals to lines 152 and 153. Further details regarding implementations of the invention employing thread hold signals are included in related U.S. patent application Ser. No. 10/424,530, entitled "METHOD AND APPARATUS FOR SELECTING AN INSTRUCTION THREAD FOR PRO- CESSING IN A MULTI-THREAD PROCESSOR," which is incorporated herein by reference.

Figure 2:
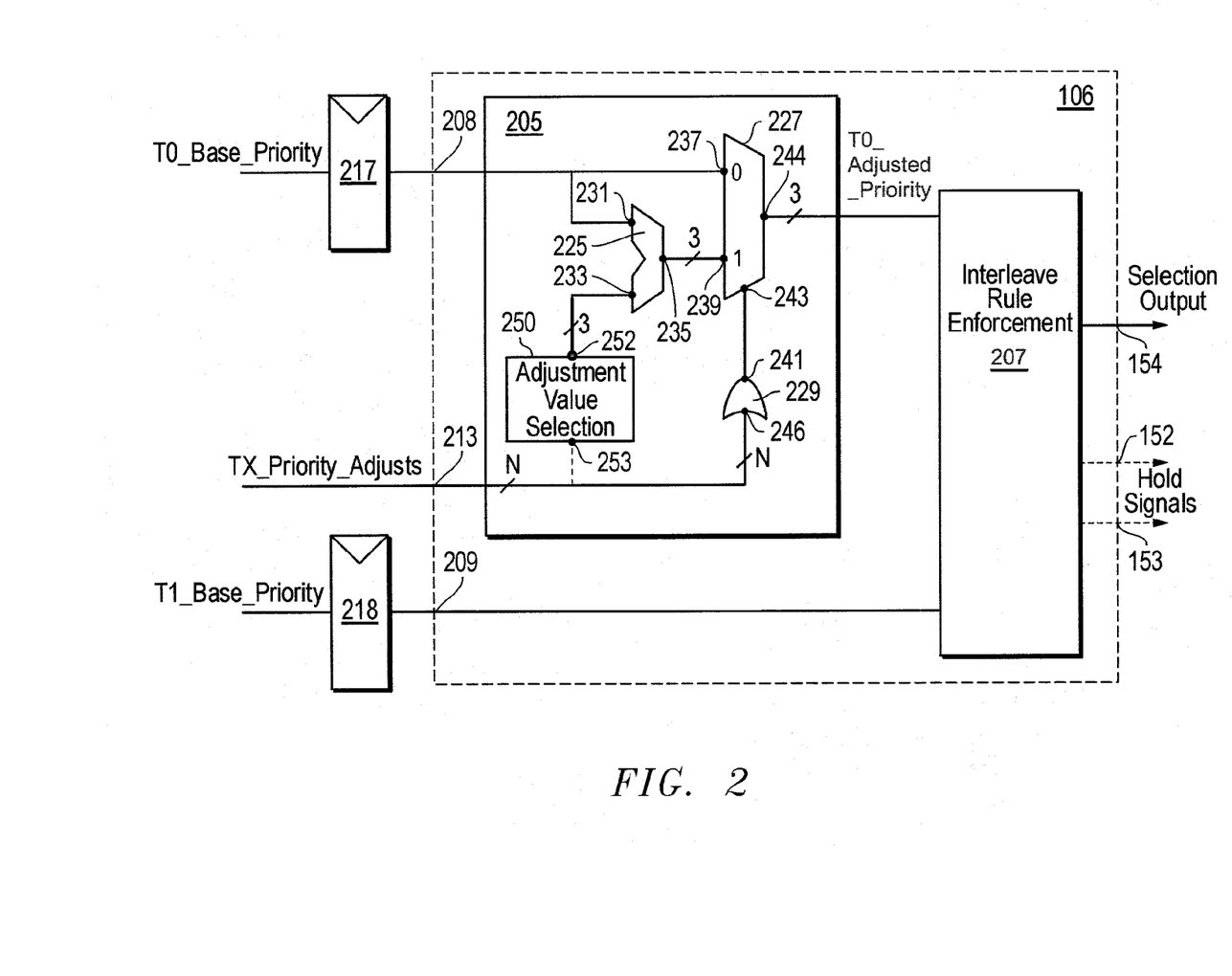
FIG. 2 is a block diagram of a thread selection controller including a thread priority adjustment circuit embodying the principles of the invention.

FIG. 2 illustrates a selection controller 106 according to one form of the invention. Selection controller 106 is adapted for controlling the interleaving of two different instruction threads, and includes priority adjustment element 205 for generating an adjusted priority signal, and interleave rule enforcement element 207 for generating a thread selection output based, at least in part, on the adjusted processing priority signal generated by priority adjustment element 205. The illustrated selection controller 106 also includes three inputs 208, 209 and 213, and at least one output 154. The output 154 from selection controller 106 corresponds to the similarly referenced signal path shown in FIG. 1 which carries a control signal used to control the interleaving of the two instruction threads. Additional outputs may comprise hold signals applied at outputs 152 and 153 discussed above with reference to FIG. 1. Inputs 208 and 209 to selection controller 106 carry base input processing priority signals representing the software assigned priorities for the two instruction threads. For example, each priority signal may indicate a processing priority of between 1 and 7 assigned to a particular instruction thread by software. Input 213 includes signal paths for one or more feedback signals from various processing elements associated with a processor such as processor 100 in FIG. 1. These feedback signals are labeled TX_Priority_Adjusts in FIG. 2 and are used to indicate the occurrence of certain events or circumstances associated with particular instruction threads that would delay processing of one or more instructions in the thread.

In the circuit shown in FIG. 2, each base input processing priority is applied through a latch. The base input processing priority (T0_Base_Priority) for a first instruction thread T0 is applied to input 208 through latch 217. The base input processing priority (T1_Base_Priority) for a second instruction thread T1 is applied to input 209 through latch 218. Each of these base input processing priorities are assigned by software.

Priority adjustment element 205 generates the adjusted input processing priority signal using adjustment logic 225, an adjustment multiplexer (MUX) 227, and an adjustment MUX controller 229. Input 208 carrying the base input processing priority is coupled to both a base priority input 231 of adjustment logic 225 and to a first MUX input 237 of MUX 227. An adjustment input 233 comprises the second input to adjustment logic device 225, while the output 235 of the adjustment logic is coupled to input 239 of MUX 227. Control for adjustment MUX 227 is provided through a control input 243, and the selected MUX input (from inputs 237 and 239) is applied at MUX output 244.

MUX controller 229 comprises an OR gate in the form of the invention illustrated in FIG. 2, and includes a feedback input 246 and an output 241. The feedback input 246 is coupled to the feedback signal path 213. Although shown as a single line in the figure, signal path 213 includes N signal paths, where N corresponds to the number of feedback signals received by thread selection controller 106. Each of these N signals is applied at input 246 and logically ORed with the other signals to provide a single digital signal at output 241 of MUX controller 229. This output 241 is coupled to the control input 243 of MUX 227 so that the signal at the MUX controller output 241 provides the selection control for MUX 227. That is, based on the feedback received at feedback input 246, MUX controller 229 controls which input of MUX 227 is delivered to interleave rule enforcement element 207, either the unadjusted base priority at MUX input 237 or the adjusted priority signal at MUX input 239.

Adjustment logic 225 may comprise an addition device, a subtraction device, a bitwise comparator, or another similar element capable of generating an adjusted input processing priority signal. In a preferred form, adjustment logic 225 comprises a subtraction device that generates an adjusted priority signal at output 235 indicating a priority less than that of the base input processing priority signal (T0_Base_Priority). In other forms of the invention, adjustment logic 225 may comprise an addition device that generates an adjusted priority signal indicating a priority greater than the priority indicated by the base priority signal.

Whether adjustment logic 225 is implemented as a subtraction device, an addition device, or some other device, an adjustment value selection device 250 can be used to determine the amount by which the base priority is to be changed. The value selected by device 250 is applied to the second input 233 of adjustment logic 225 through selection device output 252. In one embodiment, selection device input 253 is coupled to the feedback signal path(s) 213, and receives the same N feedback signals applied to MUX controller 229. In this form of the invention, adjustment value selection device 250 produces an output based on the values or states of the priority adjust feedback signals. For example, when the feedback signals indicate the occurrence of a relatively minor processing delay, device 250 may produce a relatively small value output to adjustment logic device 225. On the other hand, feedback signals at feedback input 213 indicating the occurrence of a longer processing delay will prompt device 250 to produce a relatively larger value output to adjustment logic device 225 in order to effect a relatively larger adjustment in the base priority appearing at input path 208. Selection device 250 may include any suitable logic or other structure for providing this variable output based on the feedback signals at 213.

Although a selection device such as device 250 may be used within the scope of the invention to facilitate a variable priority adjustment to the base priority signal at 208, other forms of the invention may provide a static adjustment. In this case selection device 250 would be replaced with a suitable device for providing a constant level value as the second input 233 to adjustment logic device 225.

Assume, for example, that the adjustment input 233 is tied to a fixed value of 1, and that adjustment logic 225 is a subtraction element. If the priority indicated by the T0_Base_Priority signal is 5, the adjusted input processing priority signal will be 4. If the priority indicated by the T0_Base_Priority signal is 2, the adjusted input processing priority signal will be 1. In the case where the base priority is already at the minimum for the particular priority scheme and the adjustment logic 225 is a subtraction element, adjustment logic 225 preferably simply declines to decrease the priority below the normal minimum value, and produces an output at 235 equal to the input at 231. Similarly, in the case where the base priority is already at the maximum value for the particular priority scheme and the adjustment logic 225 normally adds some value to produce the adjusted input processing priority, the system may be configured so that the adjustment logic simply declines to increase the priority value further.

Even though priority adjustment element 205 has been described as adjusting the priority of an instruction thread based on feedback associated with the same thread, it will be appreciated that priority adjustment element 205 can produce an adjusted input processing priority signal in other ways. For example, if feedback indicates the input processing priority of an instruction thread other than the T0 instruction thread is experiencing some event that delays processing an instruction in the thread, then priority adjustment element 205 can increase the priority of the T0 thread. The effect is still to alter the relative priorities of the instruction threads being interleaved to account for events occurring in the current processing environment, thereby facilitating more efficient use of processor resources.

It will be appreciated that the adjustment of instruction thread processing priority according to the present invention has particular application in reacting to processing delays associated with one or more instructions in a given instruction thread. These processing delay situations represent situations in which it would clearly be beneficial to adjust one or more thread processing priorities. However, the invention is not limited to any particular manner of producing the feedback signals used to decide whether a thread priority will or will not be adjusted, and the extent of the adjustment. That is, the feedback signals shown at input 213 in FIG. 2 may indicate a processing delay or any other condition in which it might be desirable to adjust the base processing priority of one or more instruction threads.

The form of the invention shown in FIG. 2 may constantly produce an adjusted priority value available for selection through MUX 227 as an alternative to the base input processing priority. Other forms of the invention may produce an appropriate adjusted priority signal only as necessary when it is desirable to actually adjust the base input processing priority.

Interleave rule enforcement element 207 receives priority signals for each instruction thread being processed. In the embodiment illustrated in FIG. 2, these priority signals comprise the T0_Adjusted_Priority signal from output 244 of MUX 227, and the T1_Base_Priority signal on signal path 209. Interleave rule enforcement element 207 uses the priority values indicated by these two priority signals to generate an output selection signal on signal path 154 indicating which thread is selected for processing. This output selection signal on signal path 154 controls the interleaving or selection of instructions from the different instruction threads as described above with reference to FIG. 1.

Interleave rule enforcement element 207 may comprise any suitable element for generating the selection output to control thread selection. In some cases interleave rule enforcement element 207 may interleave instructions from the different threads based only on a difference between the input priority values. A single adjustment arrangement 205 is included in the embodiment shown in FIG. 2 because it is only the difference in the priority values that are of interest to interleave rule enforcement element 207. However, other interleave rule enforcement elements may produce the selection output signal based on factors other than the absolute difference between the input priority values. In these cases, a separate adjustment arrangement similar to arrangement 205 may be used to adjust the priority value associated with the T1 thread.

Figure 3:
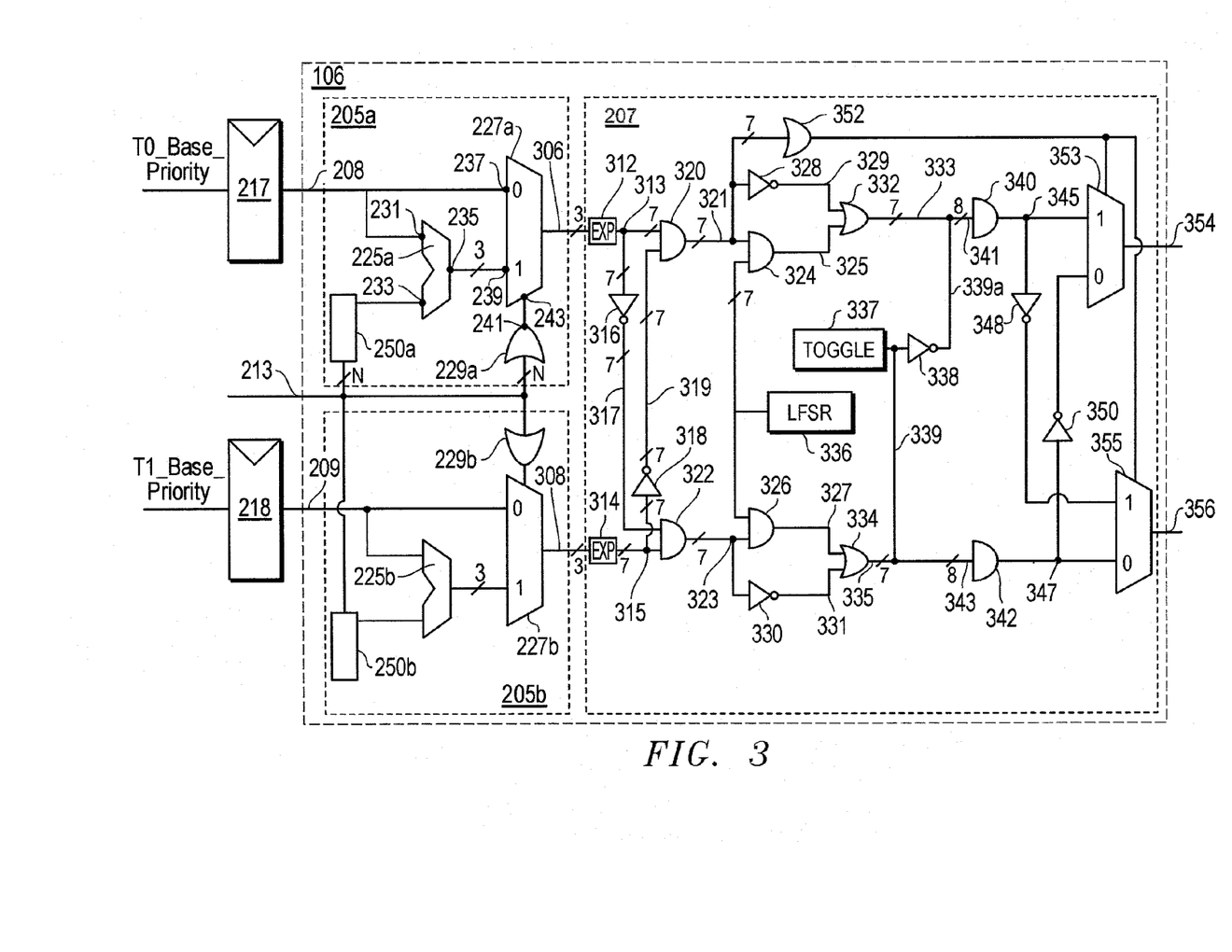
FIG. 3 is a schematic diagram of a selection controller incorporating the thread priority adjustment circuit of FIG. 2 with a particular interleave rule enforcement circuit.

FIG. 3 illustrates a preferred form of selection controller 106 for adjusting the processing priority of an instruction thread and generating a control output based on the adjusted processing priority. The specific embodiment of controller 106 illustrated in FIG. 3 includes two priority adjustment elements 205a and 205b each corresponding to priority adjustment element 205 shown in FIG. 2. Each of these adjustment elements selectively adjusts a respective one of the base input processing priorities, T0_Base_Priority and T1_Base_Priority. FIG. 3 also shows details of one preferred interleave rule enforcement element 207.

Selection controller 106 illustrated in FIG. 3 is made up of two branches. A first branch is associated with the first thread T0 and the first thread priority signal T0_Base_Priority. This first branch of circuit 106 will be referred to as the first thread or T0 branch. A second branch is associated with the second thread T1 and the second thread priority signal T1_Base_Priority. This second branch will be referred to as the second thread or T1 branch. Since both the T0 and T1 branches include the same components and perform the same functions, the T0 branch will be used as the basis of the following discussion unless otherwise indicated. Referring to the far left in FIG. 3, latch 217 applies the T0_Base_Priority signal to the T0 branch input node 208. Latch 217 latches and holds the T0 thread priority signal at input node 208 as long as the base priority of the first thread or T0 thread remains unchanged. This base thread priority is set and changed under software control.

Priority adjustment element 205a for branch T0 includes an adjustment MUX 227a, a MUX controller 229a, adjustment logic 225a, and adjustment value selection logic 250a. Each of these components corresponds to the similarly referenced component shown in FIG. 2 for priority adjustment element 205, and performs the identical function as the corresponding component in FIG. 2. Specifically, adjustment MUX 227a selects between the base input processing priority signal (T0_Base_Priority) appearing at 208 and an adjusted priority signal supplied from adjustment logic 225a. The selection at adjustment MUX 227a is performed under the control of MUX controller 229a based upon N feedback signals applied through the signal paths shown at 213. Adjustment value selection logic 250a provides an adjustment value to adjustment logic 225a also based upon the same N feedback signals. The result of this selection through adjustment MUX 227a, either a value equal to T0_Base_Priority or an adjusted priority value is applied to node 306 as an input to interleave rule enforcement circuit 207. Regardless of which particular priority value is selected through MUX 227a, the resulting priority value at node 306 represents a priority for the first thread T0 in the SMT processor, and interleave rule enforcement circuit 207 operates on the first thread priority value in the same fashion whether the value is adjusted from the base input value via adjustment element 205a or is not adjusted.

Node 306 is connected to the input of expander 312. Expander 312 expands the T0, M adjusted thread priority value bitwise to produce an expanded priority signal. In the illustrated embodiment, the adjusted priority signal at node 306 is a 3 bit binary coded signal indicating a priority in the range of 1 to 7. Expander 312 expands the 3 bit signal at node 306 to produce a 7 bit logic signal at node 313 in which a number of bits corresponding to the priority value are set. For example, if the first thread priority at node 306 is 5, that is a 3 bit binary value 101, then the 7 bit expanded signal at node 313 will be 0011111. If the first thread priority is 3, then the 3 bit logical signal at node 306 will be 011, and the 7 bit expanded signal at node 313 will be 0000111.

Once expander 312 has generated the 7 bit, expanded first priority signal at node 313, inverter 316 performs a bitwise inversion of the expanded priority signal and directs the inverted signal through node 317 to the input of AND gate 322, which is part of the T1 branch. The T1 branch, having similarly expanded the second thread priority value to produce an expanded signal at node 315 and inverted the second thread priority signal at inverter 318, directs the inverted second thread priority signal through node 319 to the input of AND gate 320. AND gate 320 performs a bitwise logical AND operation to combine the expanded and inverted second thread priority signal with the expanded first thread priority signal to generate a signal referred to herein as the T0 mask at node 321. Note that the 7 bit AND result at node 321 represents a difference between the first thread priority value and the second thread priority value.

The 7 bit signal at node 321 provides one input to AND gate 324 and the input to inverter 328. The signal at node 321 is also coupled to the input of OR gate 352, which serves as a MUX controller, for both branches T0 and T1 as will be described further below. The output of a linear feedback shift register (LFSR) 336 provides the other input to AND gate 324. The LFSR 336 output comprises a random or pseudo random number up to seven bits in length produced each clock cycle. AND gate 324 performs a bitwise logical AND operation between the pseudo random or random number generated by LFSR 336 and the T0 mask at node 321 to generate a randomized mask signal at node 325.

The randomized mask signal at node 325 provides one input to OR gate 332. The output of inverter 328 produces an inverted mask signal at node 329, which represents the other input to OR gate 332. It should be noted that both inputs to OR gate 332 are 7 bits wide. OR gate 332 performs a bitwise logical OR operation on these two 7 bit inputs (the randomized mask signal at node 325 and inverted mask signal at node 329) and applies the 7 bit output to node 333. As a result of this OR operation, if a particular bit position in either the inverted T0 mask or the randomized T0 mask contains a logical 1, that same bit position in the signal at node 333 will also contain a logical 1.

Circuit 106 in FIG. 3 also includes a toggle arrangement 337 for generating a single bit logical signal that toggles back and forth between logical states with each clock cycle of the processor in which circuit 106 is employed. The output of toggle arrangement 337 is applied to node 339 and inverted by associated inverter 338 to produce a single bit-signal at node 339*a*. This single bit at node 339*a* is appended to the 7 bit signal at node 333 to produce an 8 bit input at node 341 which provides the input to AND gate 340. AND gate 340 performs a logical AND operation on the 8 bit signal at node 341 to generate a single bit output at node 345.

Before proceeding further with the discussion of the T0 branch of circuit 106 illustrated in FIG. 3, it will be noted that the T1 branch of the circuit includes similar circuit elements to the T0 branch and performs corresponding operations on the T1 thread priority signal (T1_Base_Priority) applied at input 209. Latch 218 provides the T1_Base_Priority signal to one input of adjustment MUX 227*b* included in priority adjustment element 205*b*. Adjustment MUX 227*b* selects between this input signal at input node 209 and an adjusted second thread priority signal provided from adjustment logic 225*b*. The selection between the unadjusted priority value from input node 209 and the adjusted value from logic 225*b* is controlled by MUX controller 229*b* in response to the same N feedback signals applied to MUX controller 229*a*. The N feedback signals from feedback input 213 are also applied to adjustment value selection logic 250*b* which provides an appropriate adjustment value to adjustment logic 225*b* based upon the feedback signals. The resulting signal, either the unadjusted T1_Base_Priority value or an appropriately adjusted priority value from adjustment MUX 227*b* is applied as the T1 thread priority input signal to node 308 as the second input to interleave rule enforcement circuit 207.

At this point the differences between the arrangement shown in FIG. 2 and that shown in FIG. 3 should be noted. The arrangement shown in FIG. 2, includes a single priority adjustment element 205 which operates to adjust the priority value associated with a single one of the two instruction threads T0 and T1. Adjusting only a single thread value based on feedback from various processor elements is appropriate where the interleave rule enforcement circuit 207 enforces a rule based only upon the absolute difference between the thread priority values. However, where the interleave rule enforcement circuit 207 responds not only to the priority difference between the instruction thread priority values but also the priority values themselves, a circuit according to the invention preferably includes an adjustment arrangement for adjusting each base input processing priority value. Thus, the second thread priority adjustment element 205*b* shown in FIG. 3. This second thread priority adjustment element 205*b* is shown in FIG. 3 for purposes of example even though the priority rule enforcement circuit 207 actually operates only upon the difference between the two input priority values to that circuit. Also, even where the interleave rule enforcement circuit 207 enforces a rule based only upon the difference between the input priorities, priority adjustment elements such as 205*a* and 205*b* may be used to produce that desired priority value difference based upon the feedback signals from the processor 100.

Note also that although MUX controllers 229*a* and 229*b*, and adjustment value selection logic 250*a* and 250*b*, are illustrated as using common feedback signals at feedback input 213, some or all of these elements may use different sets of feedback signals. For example, MUX controllers 229*a* and 229*b*, and adjustment value selection logic 250*a* and 250*b*, may all receive a common set of feedback signals associated with both the T0 thread and the T1 thread as indicated in FIG. 3. Alternatively, MUX controller 229*a* and adjustment value selection logic 250*a* may receive feedback associated only with T0 priority signal (T0_Base_Priority), while MUX controller 229*b* and adjustment value selection logic 250*b* may receive feedback associated only with T1 priority signal (T1_Base_Priority). The invention is not limited to any particular feedback arrangement, but encompasses any feedback arrangement that may be used to provide a control for controlling the adjustment of a base input processing priority or any set of such priorities used in the SMT processor.

The second thread T1 priority signal at node 308, actually adjusted or otherwise, is a 3 bit signal similar to the signal at node 306, and expander 314 expands the 3 bit T1 priority signal to a 7 bit signal at node 315. AND gate 322 bitwise ANDs the 7 bit signal at node 315 with the inverted 7 bit signal at node 317 and applies the 7 bit output to node 323. This signal at node 323 represents a 7 bit mask of the adjusted T1 thread priority. AND gate 326 produces a randomized second thread mask by bitwise ANDing the pseudo random number from LFSR 336 with the signal at node 323 and at OR gate 334, this randomized second thread mask output at node 327 is bitwise ORed with the inverted signal at node 331 from inverter 330 to generate a 7 bit signal at node 335. The single bit at node 339 is appended to this 7 bit signal at node 335 to produce an 8 bit signal at node 343 with provides the input to AND gate 342. It will be noted that the appended bit at node 343 will always be opposite to the bit appended at node 341 in the T0 branch. Similarly to AND gate 340, AND gate 342 logically ANDs the 8 bit input at node 343 to produce a single bit output at node 347.

The single bit signal at node 345 provides one input to a T0 branch MUX 353, while the single bit signal at node 347 provides one input to a T1 branch MUX 355. The second input to T0 branch MUX 353 comprises the inverted signal produced by inverting the signal at node 347 with inverter 350. Similarly, the second input to T1 branch MUX 355 comprises the inverted signal produced by inverting the signal at node 345 with inverter 348. OR gate 352 logically ORs the first thread mask signal at node 321 to produce a single-bit MUX select signal which is applied to control both MUXs 353 and 355. It will be noted that the output of OR gate 352 will equal 1 when the first thread priority (at node 306 and as adjusted by element 205a) is greater than the second thread priority (at node 308 and as adjusted by element 205b). However, the output of OR gate 352 will equal 0 when the two input priorities are equal or the second thread priority is greater than the first thread priority. The MUX select signal controls MUX 353 and MUX 355 to connect one input each to output nodes 354 and 356, respectively.

The signal at output node 354 comprises a binary signal that may be used to control the selection MUX 105 shown in FIG. 1. Thus, the signal at node 354 may represent the selection control signal at node 154 shown in both FIGS. 1 and 2. The signal at node 356 represents the binary complement of the signal at node 354 and thus may also be used as the control signal at node 154 in FIGS. 1 and 2 to control thread selection MUX 105 in FIG. 1, by merely reversing the logic of the MUX with respect to the logic used with the signal at node 354 as the control signal. Because the circuit 207 is shown in FIG. 3 merely as an example of one preferred interleave rule enforcement circuit 207 with which the present base input priority adjustment arrangement may be used, examples showing the operation of circuit 207 in FIG. 3 will be omitted from this disclosure. Detailed examples of the operation of rule enforcement circuit 207 in FIG. 3 are set out in related U.S. patent application Ser. No. 10/424,533, entitled METHOD AND APPARATUS FOR RANDOMIZING INSTRUCTION THREAD INTERLEAVING IN A MULTI-THREAD PROCESSOR," which is incorporated herein by reference.

As noted above, either of the signals at nodes 354 and 356 may be used to control MUX 105 for passing instructions from the first and second queues 101 and 102 shown in FIG. 1. In the logic of the specific circuit shown in FIG. 3, a 0 value at node 354 would cause MUX 105 to select the first thread and pass an instruction or instructions from first queue 101 in a given clock cycle. A value of 1 at node 354 would cause MUX 105 to pass instructions from the second queue 102 in a given clock cycle. If the signal at node 356 were used to control MUX 105, a 0 value at node 356 would cause MUX 105 to pass an instruction from second queue 102 in a given clock cycle and a value of 1 at node 356 would cause MUX 105 to pass an instruction from first queue 101 in a given clock cycle. The signals at nodes 354 and 356 may also be used to generate the control signals applied at 152 and 153 shown in FIG. 1. Related U.S. patent application Ser. No. 10/424,530, filed concurrently herewith and entitled "METHOD AND APPARATUS FOR SELECTING AN INSTRUCTION THREAD FOR PROCESSING IN A MULTI-THREAD PROCESSOR" describes an embodiment of the present invention employing the signals at nodes 354 and 356 as control signals for the two instruction queues 101 and 102.

The above described preferred embodiments are intended to illustrate the principles of the invention, but not to limit the scope of the invention. Various other embodiments and modifications to these preferred embodiments may be made by those skilled in the art without departing from the scope of the following claims. For example, the logic and other circuitry illustrated provide specific examples of how the disclosed invention can be implemented, but the disclosed circuits may be implemented in positive or negative logic. Also, different combinations of logic gates could be used to achieve the same results, and such changes should be considered equivalents of the structure disclosed. Finally, modifications to the various methods disclosed for interleaving instruction threads, adjusting the priority of the input processing priorities, inserting randomizations, and similar changes to make the invention compatible with different processor types and architectures, should also be considered as equivalent to the methods disclosed. In particular, although two-thread SMT processing arrangements are described above and illustrated in the drawings, the invention is by no means limited to SMT processors capable of processing only two instruction threads. Rather, base input thread priority adjustment based on hardware feedback according to the present invention may be used with any SMT processor using cycle-by-cycle interleave rule enforcement.

The invention claimed is:

1. A method for controlling the cycle-by-cycle interleaving of instructions between a number of instruction threads in a simultaneous multithreading processor, each respective instruction thread being stored in a respective queue of the simultaneous multithreading processor and being made up of instructions that have previously been fetched by a fetcher unit of the processor for execution, the method including the steps of:
   (a) receiving a first priority signal indicating a first base input processing priority associated with a first instruction thread included in the number of instruction threads;
   (b) receiving a feedback signal associated with one of the instruction threads;
   (c) adjusting the first base input processing priority to generate a first adjusted input processing priority in response to the feedback signal;
   (d) applying an interleave rule to the first adjusted input processing priority and at least one other thread processing priority to generate a thread selection control signal for controlling the interleaving of instructions from the number of instruction threads, the interleave rule specifying a relative frequency at which instructions are to be taken from each of the number of instruction threads; and
   (e) applying the thread selection control signal to control a selection multiplexer having a respective input for each one of the number of instruction threads.

2. The method of claim 1 further including the step of selecting between the first base input processing priority and the first adjusted input processing priority in response to the feedback signal.

3. The method of claim 1 wherein the step of receiving the feedback signal includes receiving a signal associated with a long-latency event.

4. The method of claim 3 wherein the long-latency event is associated with the first instruction thread and the step of adjusting the first base input processing priority includes decreasing the first base input processing priority.

5. The method of claim 3 wherein the long-latency event is associated with an instruction thread other than the first instruction thread and the step of adjusting the first base input processing priority includes increasing the first base input processing priority.

6. The method of claim 1 further including the steps of:
   (a) receiving a second priority signal indicating a second base input processing priority associated with a second instruction thread included in the number of instruction threads;
   (b) adjusting the second base input processing priority to generate a second adjusted input processing priority in response to the feedback signal; and
   (c) applying the interleave rule to the first adjusted input processing priority and at least the second adjusted input processing priority to generate the thread selection control signal for controlling the interleaving of instructions from the number of instruction threads.

* * * * *